United States Patent Office 3,387,547
Patented June 11, 1968

3,387,547
MULTIPLEX STILL-FRAME CAMERA
Clayton W. Houghton, Smithtown, N.Y., assignor to Aeroflex Laboratories Incorporated, a corporation of Delaware
Continuation-in-part of application Ser. No. 477,895, Aug. 6, 1965. This application June 30, 1967, Ser. No. 650,349
9 Claims. (Cl. 95—36)

ABSTRACT OF THE DISCLOSURE

A system for photographically developing a plurality of dissected interdigitated images of a succession of scenes on a single photosensitive frame or format of desired size comprises an objective lens system for forming an aerial image of each scene and a two-dimensional array of minute objective lenses having a magnification substantially less than unity and having their object plane substantially coincident with the plane of such aerial image. A photosensitive surface, such as a photographic film or plate, is disposed in the conjugate image plane of the array of lenses. An aperture is located approximately in the nodal plane of the objective lens system and is movable in discrete steps in orthogonal directions in a plane substantially normal to the optical axis of the system. For each position of the aperture, the system forms a pattern of separated elemental image portions which collectively make up a complete scene, the patterns formed of successive scenes with different aperture positions being interdigitated. A viewing apparatus comprises a planar source of light and substantially the converse optical system from the camera and a viewing screen in the position occupied by the visual subject during taking.

Cross reference

This application is a continuation-in-part of applicant's prior application Ser. No. 477,895, filed Aug. 6, 1965, and entitled, "Multiplex Optical-Translating Apparatus," now abandoned.

Background of the invention

The apparatus of the invention has utility in photographically recording aerial, space, intelligence, reconnaissance, or surveillance information or documentary or photographic data and in data storage and retrieval systems.

The conventional practice in photographically recording a plurality of different scenes or other visual information is to develop the same on successive areas of a film by means of a strip-film type camera or equivalent. A disadvantage of such a recording system is the large amount of film footage required for a large number of separate frames and the consequent requirement of devices for transporting the film through the camera and for storing it.

Furthermore, there have been proposed certain photographic systems of the type including an optical system which dissects the scene into a half-tone pattern comprising a series of dots, each of a density corresponding to the luminance of an elemental area of the scene but carrying no pictorial detail of such area. The resolution of the reproduction formed by such a system is dependent solely on the number of dots in the image, which becomes impractical for most applications. Such a system is to be contrasted to the still-frame camera of the present invention in which each elemental image portion is a faithful reproduction of a corresponding portion of the scene being reproduced and the resolution of the resulting array of image portions is limited only by the optical resolution of the individual lenses of the array and the resolving power of the photosensitive medium, for example the grain of a photosensitive emulsion.

It is an object of the invention, therefore, to provide a new and improved multiplex still-frame camera which obviates the above-noted disadvantages of prior photographic recording apparatus and one in which any desired number of images may be dissected and interdigitated within a common desired area of a photosensitive medium.

Summary of the invention

In accordance with the invention, there is provided a multiplex still-frame camera for translating a subject of which an optical image may be formed to a substantially planar photosensitive surface comprising an objective lens system so disposed that the subject is located in an object plane thereof and effective to form an aerial image in its conjugate image plane, a planar array of minute objective lenses disposed with their object plane substantially coincident with the aerial image plane of the objective lens system, and an aperture element disposed near the nodal plane of the objective lens system the aperture element and the objective lens system being relatively movable in discrete steps in at least one direction normal to the optical axis thereof, whereby successive step-by-step movements of the aperture element cause a plurality of complete interdigitated patterns to be recorded on a photosensitive surface disposed in the conjugate image plane of the array of lenses.

For a better understanding of the present invention, together with other and further objects thereof, reference is had to the following description, taken in connection with the accompanying drawings, while its scope will be pointed out in the appended claims.

Brief description of the drawings

In the drawings:

FIG. 3 is a diagram of the geometric optics of the apparatus of FIG. 1, while

Brief description of a preferred embodiment of the invention

Figure 1:
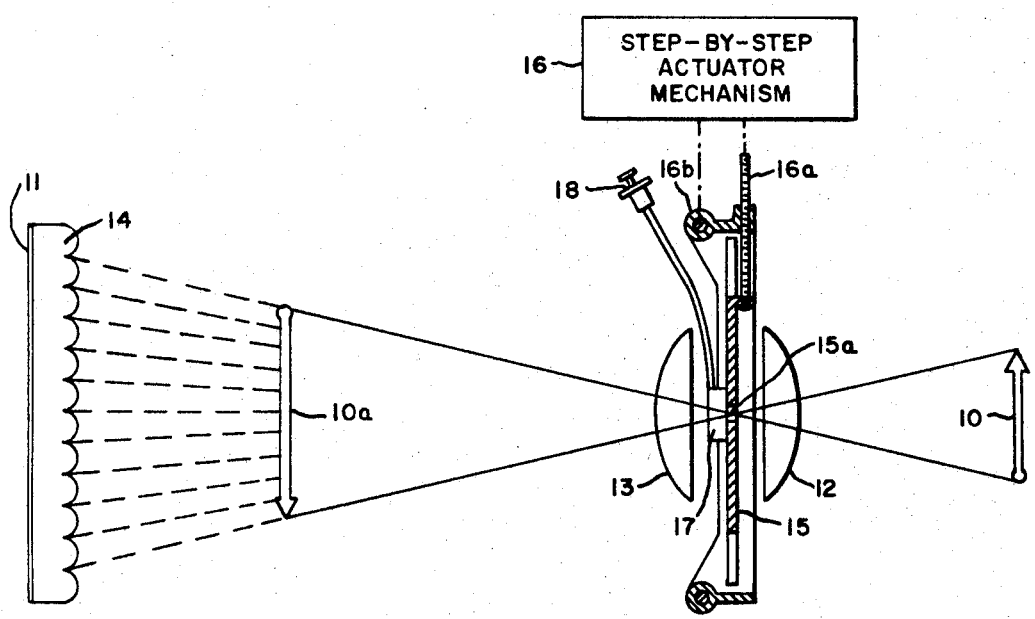
FIG. 1 is a schematic representation of a multiplex still-frame camera embodying the invention.

Referring now more particularly to FIG. 1 of the drawings, there is represented a multiplex still-frame camera for translating an optical subject 10, which may be a physical subject or an aerial image of a scene to be photographed, to a substantially planar photosensitive surface 11, which may be a conventional photographic emulsion.

The camera of FIG. 1 includes an objective lens system so disposed that the subject 10 is located in an object plane thereof and an aerial image 10a is formed in its conjugate image plane. Such lens system is shown, by way of example, as consisting of a pair of closely spaced lens elements 12 and 13. The camera further includes a planar array 14 of minute objective lenses with their object plane disposed substantially coincident with the conjugate image plane of the lens system comprising the elements 12, 13, as described hereinafter. The lenses of the array 14 are preferably arranged in a regular predetermined pattern to ensure no loss of imagery detail between lenses.

The lens array 14 is preferably in the form of a continuous homogeneous molded plastic plate, each lens having one surface which is approximately a segment of a sphere. Preferably, the photosensitive emulsion 11 is applied directly to the rear surface of the plate 14.

Figure 2:
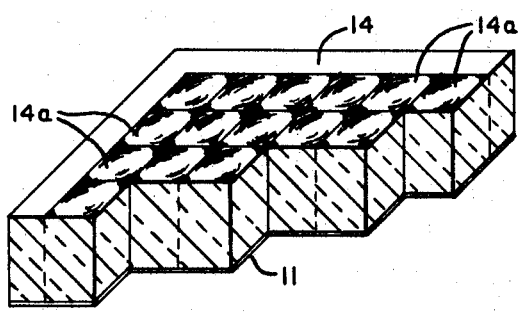
FIG. 2 is a fragmentary sectional view of a two-dimensional array of minute lenses embodied in the apparatus of FIG. 1.

As shown in FIG. 2, each minute lens 14a is approximately of regular polygonal cross-section, specifically square, at its base and, as shown in dotted lines, is effectively in the form of a cylinder of square cross-section although actually there are no divisions between the individual lenses 14a making up the plate 14.

In practice, the lens array 14 is molded from a die which is effective to make the surfaces of the individual lenses 14a spherical.

Disposed near the nodal plane of the lens system, for example between the lens elements 12 and 13, is an aperture element or plate 15 having an aperture 15a therein of dimensions which are of a lower order of magnitude than those of the field of the lens system 12, 13 and which are a function of the dimensions of the lenses of the array and of the optical ratio to the image plane. The aperture element 15 is movable in discrete incremental steps in at least one direction normal to the optical axis thereof and preferably throughout the effective aperture of the objective lens system, the incremental movements of the aperture element preferably approximating the dimension of the aperture in the direction of movement. To this end there is illustrated schematically a typical conventional step-by-step actuator mechanism 16, which may be of any well known type, typically terminating in a threaded lead screw 16a for adjusting the aperture element 15 vertically and a lead screw 16b for adjusting the aperture element 15 horizontally, as viewed in FIG. 1, thus moving the aperture element 15 in two orthogonal directions normal to the optical axis of the lens system comprising elements 12, 13. Each of the dimensions of the aperture approximates one-half the incremental movement thereof in the direction of movement, preferably including a small increment providing a mechanical margin of safety to ensure that no portion of the visual subject 10 is omitted. In a modification of the invention, the aperture element 15 is movable only in a single direction and the spherical lenses of the array 14 are replaced by linear or semicylindrical lenses extending in a direction normal to the direction of movement of the aperture element 15.

The camera of FIG. 1 further includes a conventional shutter cap 17 which may be mounted on the aperture element 15 and actuated by any suitable actuating means such as a push rod 18 to effect an exposure of the photosensitive element 11 between successive movements of the aperture element 15 and to occlude the aperture between successive exposures.

Figure 3:
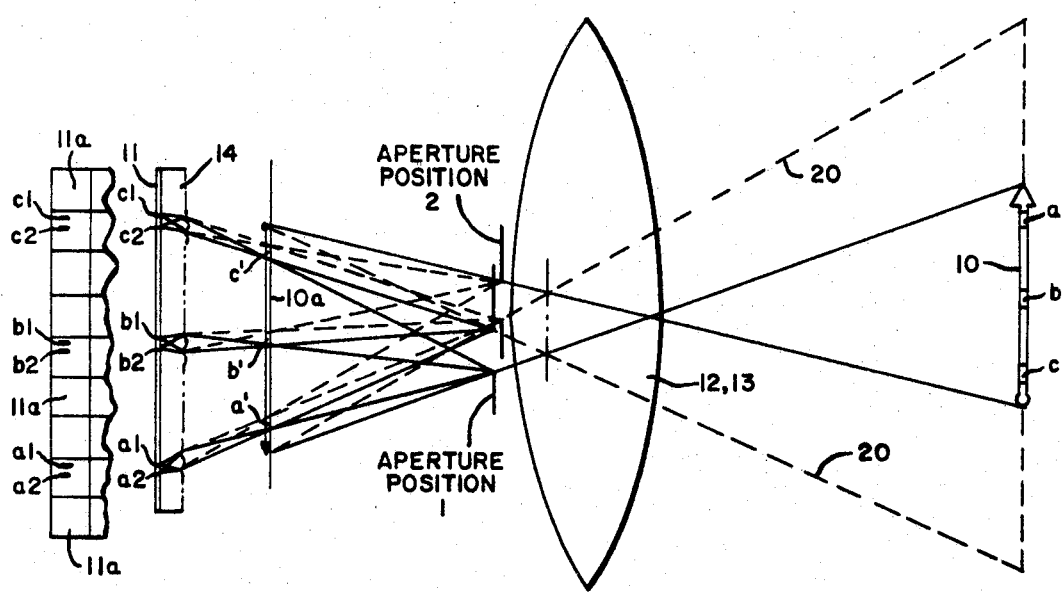

In explaining the operation of the apparatus of FIG. 1, reference is made to FIG. 3 which represents the geometric optics of the apparatus of FIG. 1. As there indicated, an optical image 10 to be photographed is disposed in the object plane of the lens system 12, 13 which forms an inverted aerial image 10a at the conjugate image plane of the lens system. Thus, portions a, b, c of image 10 appear at a', b', c' in the virtual image 10a. Each of the lenses of the array 14 "sees" an elemental portion of the aerial image 10a. For ease of explanation, the image 10 is shown as of substantially a single dimension but it is understood that, in general, the image will be two-dimensional, the second dimension being horizontal in planes normal to the plane of the drawing.

Thus, with the aperture element 15 in Position 1 of FIG. 3, three of the lenses of the array 14 "see" the portions a', b', c' of the aerial image 10a, as indicated by the solid-line rays, and form reduced reproductions thereof on the photosensitive emulsion at positions a1, b1, c1, respectively. Upon movement of the aperture element 15 to Position 2, FIG. 3, the same lenses of the array 14 still "see" substantially the same portions a', b', c' of the aerial image 10a, as indicated by the dashed-line rays, but, since the illumination for reproducing these image portions passes through the aperture of element 15, the array of lenses views the aerial image 10a from a different angle and reproduces on the photosensitive emulsion 11 a series of elemental image portions shifted to the positions a2, b2, c2. If the array 14 has n lenses in each dimension, each of the lenses will "see" 1/nth of the aerial image 10a in that dimension plus a small overlap of the portions seen by adjacent lenses to ensure that there are no gaps in the resulting image due to underlap of the individual object fields of the lenses.

The dimensions of FIG. 3 are greatly distorted to aid in the explanation, but typical dimensions are given hereinafter. As the aperture element 15 is moved, as described above, the aerial image 10a moves transversely also so that each lens of the array 14 does not "see" exactly the same portion of the aerial image 10a for all positions of the aperture element 15. However, the ratio of the object distance of the lens system 12, 13 to the image distance to the aerial image 10a is so great that the transverse movement of the aerial image 10a is not significant and each lens of the array 14 does see substantially the same portion of the image as the aperture element 15 moves over its range. Moreover, the aperture element 15 is at such a great distance from the lens array 14 relative to the focal length of the lens elements thereof that, as a practical matter, the aperture may be assumed to be at an infinite distance so that each of the lenses of the array 14 is illuminated by substantially parallel light, the aperture serving as a source of illumination so far out of focus that it is not "seen" by the lenses of the array 14.

At the left of FIG. 3 is a fragmentary view of the photographic emulsion 11 showing the arrangement of the exposed areas a1, b1, c1 and a2, b2, c2 thereon. Actually, each of the component areas 11a of the emulsion 11 will include the reproduction of elements of a great many separate optical subjects photographed by successive exposures of the camera. The dimensions of the system and the optical ratios are so chosen that, over the normal range of movement of the aperture element 15, the reproduced image portions a1, b1, c1 are not shifted far enough that the image portion of any given lens for one extreme position of the aperture element 15 will overlap that of an adjacent lens for the opposite extreme position of the aperture element and thus shift from one of the areas 11a of the emulsion to an adjacent area so that images of successive scenes would be partially superimposed. As shown in FIG. 3, the field of the objective lens system 12, 13, represented by the dashed lines 20, is made somewhat wider than the subject 10 to take care of movement of the aperture element 15 over its normal range.

In the operation of the multiplex still-frame camera of the invention described, it is initially focused so that an optical subject 10 lies in the object plane of the objective lens system 12, 13 and, with the shutter 17 closed, the aperture plate 15 is moved to its extreme position in both directions of movement. The shutter 17 is then opened momentarily to expose the emulsion 1, thereby forming a pattern of separated elemental image portions (for example portions a1, b1, c1) which collectively make up a complete scene. The camera is then focused on another optical subject or scene and the aperture element 15 moved by one increment or step, for example in the vertical direction, and the shutter 17 again opened momentarily to form a second similar pattern, for example comprising the portions a2, b2, c2. This operation is continued until the aperture element has completed its excursion in the vertical direction, whereupon it is moved one increment or step in the horizontal direction and the operation continued, forming a second series of vertically displaced interdigitated patterns in the several spaces 11a of the emulsion 11. This operation is continued with respect to the remaining vertical spaces in each of the portions 11a, whereupon the single frame or format of emulsion 11 will carry a large number of patterns of separated elemental image portions collectively making up the complete scene, the pattern formed by different scenes with different positions of the aperture element 15 being interdigitated.

While the parameters of the multiplex still-frame camera of the invention may be varied over wide ranges of values, depending upon the requirements of a particular application, there follow the design parameters of one satisfactory embodiment of the invention.

Objectives lens system 12, 13:
  Object distance _____inches__      48
  Conjugate image distance ___do____    3.29
Lens array 14:
  Format (2809 lenses)_____do____    2¼ x 2¼
  Thickness _____do____    0.194
  Nominal radius of curvature _do____   0.060
  Base dimension (square) ___do____ 0.043 x 0.043
  Aperture $f$ _____     2.4
  Object distance _____inches__    1.65
  Conjugate image distance ___do____   0.194
  Magnification _____   0.10×
  Material — optical grade plastic —
    index of refraction ($n$) _____    1.48
Aperture element 15:
  Aperture (square) _____inch__ 0.085 x 0.085
Number of interdigitated pictures _____       49
Resolution limit _____lines/mm.__        17

Figure 4:
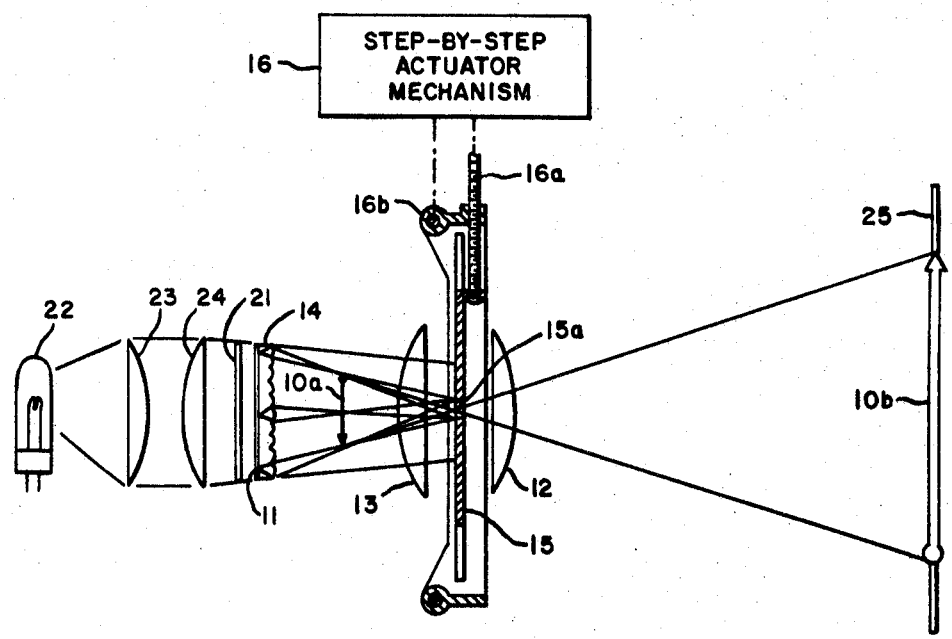
FIG. 4 is a schematic representation of an apparatus for viewing a transparency developed by the apparatus of FIG. 1.

Referring now to FIG. 4 of the drawings, there is represented schematically an apparatus for viewing, with the use of a planar source of substantially uniform illumination, a photographic transparency developed by the apparatus of FIG. 1 and chemically processed in the usual manner. The lens array 14, the objective lens system 12, 13, in aperture element 15, and its associated actuator mechanism 16 are the same as in the exposing apparatus of FIG. 1. In this arrangement, however, the planar source of illumination is a diffusing glass plate 21 illuminated by a suitable light source such as a lamp 22 and a collecting and collimating optical system shown schematically in the form of lenses 23, 24, thereby illuminating the photographic emulsion 11 substantially uniformly with substantially parallel light. The lens array 14, when illuminated, forms an aerial image 10a corresponding to the image 10a of FIG. 3 and the array 14 is so disposed with respect to the objective lens system 12, 13 that such aerial image lies substantially in the object plane of that optical system. The lens system 12, 13 thereupon reproduces the aerial image 10a as a real image 10b on a screen 25, which may be either translucent for reverse viewing or reflective for front viewing.

In the arrangement of FIG. 4, in which the optics is the reverse of that of the camera represented in FIG. 3, for each position of the aperture element 15 the lens array 14 transmits through the aperture a pattern of contiguous elemental image portions which are counterparts of corresponding portions of the orginal scene, all other patterns of interdigitated image elements on the photosensitive emulsion 11 being stopped by the aperture. To this end, the lens array 14 must be identical to that used in the exposure by the apparatus of FIG. 1 and disposed in the same position with respect to the optical system. By successive movements of the aperture element 15 in two orthogonal directions, the viewer may observe individually the entire series of interdigitated images developed on the transparency 11 in succession or at random.

In summary, by the use of the apparatus of the invention, a single photographic frame or format is produced which may comprise several hundred different and separate images or pictures, thus avoiding the complicated and complex film-transport and film-storage mechanism of a strip-film camera and viewer. By the use of such a lens array, an element of security is added since, unless there is used in viewing the identical lens array in conjunction with the same focal length, aperture size, optical reduction ratios, aperture number, dimensions, index of refraction, etc., the interdigitated patterns become hopelessly scrambled.

While there has been described what is, at present, considered to be the preferred embodiment of the invention, it will be apparent to those skilled in the art that various changes and modifications may be made therein, without departing from the invention, and it is, therefore, aimed in the appended claims to cover all such changes and modifications as fall within the true spirit and scope of the invention.

What is claimed is:

1. A multiplex still-frame camera for translating a subject of which an optical image may be formed to a substantially planar photosensitive surface comprising:
   an objective lens system so disposed that the subject is located in an object plane thereof and effective to form an aerial image in its conjugate image plane;
   a planar array of minute objective lenses disposed with their object plane substantially coincident with the aerial image plane of said objective lens system;
   and an aperture element disposed near the nodal plane of said objective lens system, said aperture element and said objective lens system being relatively movable in discrete steps in at least one direction normal to the optical axis thereof,
   whereby successive step-by-step movements of said aperture element cause a plurality of complete interdigitated patterns to be recorded on a photosensitive surface disposed in the conjugate image plane of said array of lenses, each of the elements of each of said patterns comprising a pictorial representation of an elemental area of the subject.

2. A multiplex still-frame camera in accordance with claim 1 in which the aperture of said aperture element has dimensions of a lower order of magnitude than the field of said lens system.

3. A multiplex still-frame camera in accordance with claim 1 in which each of the minute lenses has a regular polygonal cross-section and in which the aperture of said aperture element is of a configuration similar to that of said lens cross-section.

4. A multiplex still-frame camera in accordance with claim 1 in which said aperture element is movable step-by-step in two orthogonal directions.

5. A multiplex still-frame camera in accordance with claim 4 which includes a step-by-step actuating mechanism connected to said aperture element for moving the same in said two directions.

6. A multiplex still-frame camera in accordance with claim 1 in which the incremental movements of said aperture element approximate one-half the dimension of the aperture in the direction of movement.

7. A multiplex still-frame camera in accordance with claim 1 which includes a shutter element for occluding the aperture of said aperture element between successive exposures of said photosensitive surface.

8. A multiplex still-frame camera in accordance with claim 1 in which each of said minute lenses has a magnification substantially less than unity.

9. An apparatus for viewing a photographic transparency formed by the use of a camera in accordance with claim 1 comprising:
   a planar light source of substantially uniform illumination;
   a planar array of minute objective lenses disposed with their object plane substantially coincident with said planar light source;
   an objective lens system disposed with its object plane substantially coincident with the conjugate image plane of said lens array;

and an aperture element disposed near the nodal plane of said objective lens system and movable in discrete steps in at least one direction normal to the optical axis thereof, whereby successive step-by-step movements of said aperture element illuminate a plurality of complete interdigitated images on a screen disposed in the conjugate image plane of said objective lens system.

References Cited

UNITED STATES PATENTS

| | | |
|---|---|---|
| 1,935,471 | 11/1933 | Kanolt. |
| 2,150,932 | 3/1939 | McDonnell. |
| 2,833,176 | 5/1958 | Ossoinak. |
| 2,950,644 | 8/1960 | Land. |
| 3,099,195 | 7/1963 | Goodbar. |
| 3,301,154 | 1/1967 | Stewart. |

JOHN M. HORAN, *Primary Examiner.*